Patented Oct. 9, 1928.

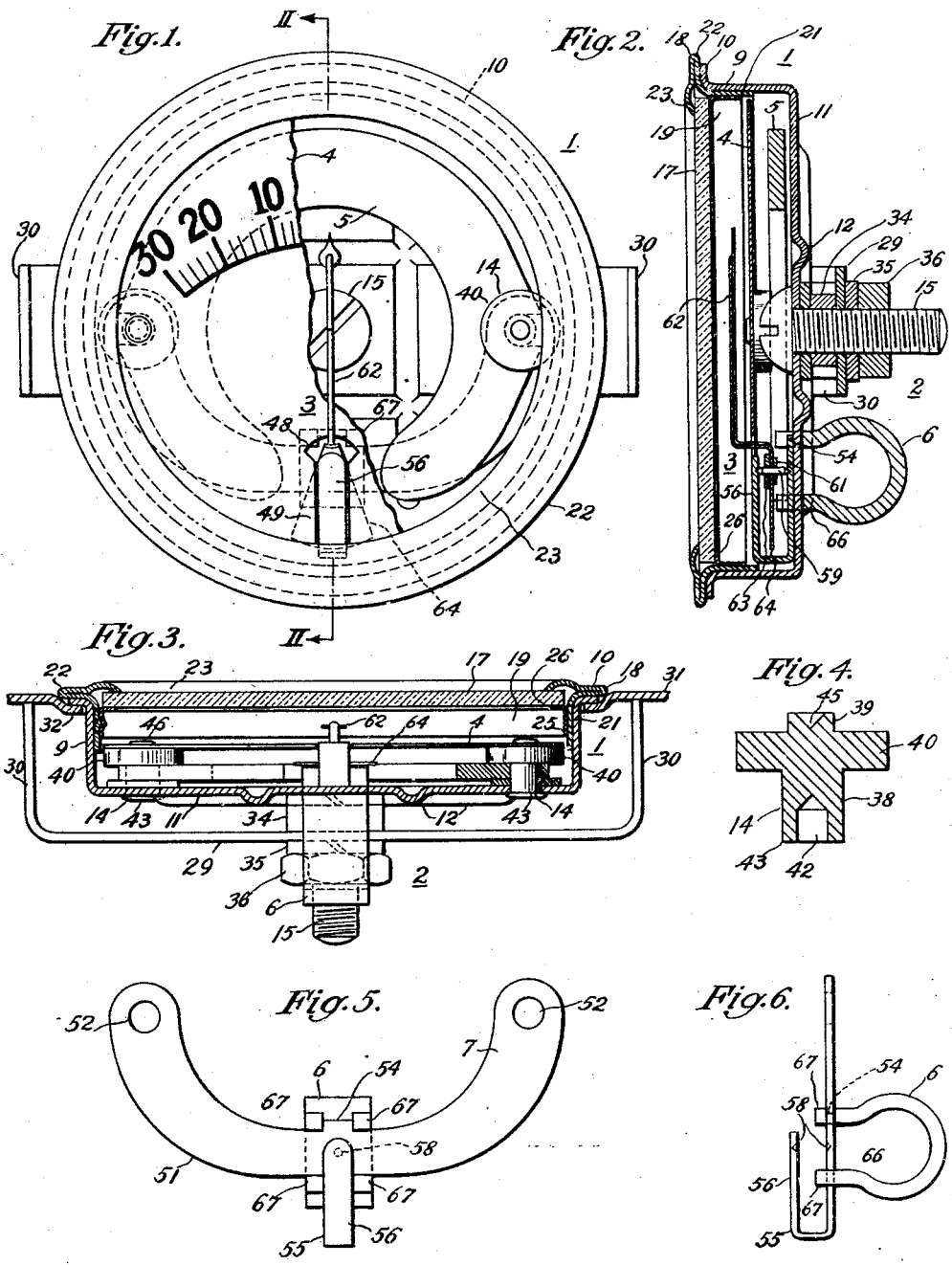

1,686,645

UNITED STATES PATENT OFFICE.

VICTOR H. TODD, OF SUMMIT, NEW JERSEY, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed August 20, 1924. Serial No. 733,052.

My invention relates to electrical measuring instruments and particularly to ammeters for use in connection with storage batteries, automobiles and similar devices.

One object of my invention is to provide an instrument, of the above indicated character, that shall be simple and durable in construction, economical to manufacture and effective in its operation.

Another object of my invention is to provide a simple and effective means for permitting the rapid assembly of instrument parts in accurate co-operative relation.

A further object of my invention is to provide an electrical measuring instrument that shall be compact in construction and neat in appearance.

In my copending application, Serial No. 448,100, filed Feb. 26, 1921, Patent No. 1,580,768, is fully set forth and described an electrical measuring instrument according to the principles of which the device of my present invention operates, to which reference may be had for a better understanding of the improvements herein set forth.

In the device of my copending application, the usual actuating coil and binding posts are entirely eliminated by substituting therefor an actuating magnet of loop shape through which an uninterrupted conductor of a circuit to be measured is passed. By this arrangement of parts, the instrument is rendered extremely simple and durable in construction and economical to manufacture, and the danger of grounding, as in instruments having terminals or binding posts, is avoided.

In practicing my invention, I provide a means for so positioning the parts relative to each other as to permit the ready assembly thereof in accurate operative positions and to, thereby, further facilitate and economize in the manufacture of the instrument and to render the same reliable in service.

Figure 1 of the accompanying drawings, is a front elevational view of an instrument constructed in accordance with my invention, with parts broken away, Fig. 2 is a view, taken along the line II—II of Fig. 1, Fig. 3 is a bottom view, partially in section and partially in elevation of the device as shown in Fig. 1, and Figs. 4, 5 and 6 are detail views of parts shown in the other figures.

The instrument comprises, in general, a casing 1, a mounting device 2 therefor, a movable element 3, a scale plate 4, a permanent or control magnet 5 and an actuating magnet member or yoke 6 for the movable element 3, and a member 7 constituting a combined bearing support for the element 3 and means for accurately positioning the latter, the magnets and the casing relative to each other.

The casing 1 comprises a cylindrical side wall 9, a front flange 10 and a discoidal rear wall 11 having reinforcing ribs 12 and openings for the reception of posts 14, a screw 15 and the yoke 6.

A glass window member 17 is held in position by a rim 18 and a retaining ring 19. The rim 18 comprises a cylindrical portion 21 snugly fitting the cylindrical side wall 9 of the casing 1 and an outwardly-and-inwardly bent flange having a portion 22 for co-operative engagement with the flange 10 of the casing 1 and a yieldable portion 23 for engagement with the window member 17. The retaining rim 19 comprises a cylindrical portion 25 relatively tightly fitting the portion 21 of the rim 18 and a flange portion 26 for holding the window member 17 in position against a spring action by the portion 23 of the rim 18.

The mounting device 2 comprises a member having an apertured intermediate portion 29 for the reception of the screw 15 and end portions 30 for engagement with the rear side of an automobile cowl 31 or similar device having an opening in which the instrument is mounted and against the edge 32 of which the flange 10 rests.

A spacing washer 34, a lock washer 35 and a nut 36 complete the mounting device 2 which constitutes a bridging clamp across the rear of the casing 1 for holding the latter in position.

Each post 14 (see Fig. 4, which is an enlarged sectional detail view of one of them) comprises shank portions 38 and 39 and a relatively large discoidal portion 40. The shank portion 38 is for disposition in an opening in the rear wall 11 of the casing 1 and is initially provided with an end opening 42 permitting the end edges 43 thereof to be peened over, as shown in Fig. 3.

The relatively large discoidal portions 40 of the posts 14 provide broad expanses of supporting surface for the scale plate 4 which is provided with openings closely fitting the shanks 39. The latter are also initially provided with end openings 45 permitting the end edges 46 thereof to be peened over the adjacent parts of the scale plate 4.

The permanent or control magnet 5 is preferably of substantially flat-plate construction of C-shape having its air gap at its lowermost portion and an opening in each leg along its horizontal center line for mounting the same on the posts 14 in parallel-plane relation to the rear wall 11 of the casing 1 and to the scale plate 4.

The scale plate 4 is provided with an opening, below the center thereof, having a laterally extended or arcuate portion 48 and a parallel-sided vertical portion 49 depending from the portion 48 to the lower perimeter of the plate for purposes to be hereinafter set forth.

The member 7, preferably constructed of relatively thin sheet material, comprises a main body portion 51 of substantially U-shape having openings 52 adjacent to its ends by which it is bridged between, and is secured to, the posts 14. At its intermediate portion, the member 7 is provided with an upwardly projecting rectangular lug 54 and with an oppositely projecting straight-sided portion 55 that is bent to substantially U-shape having a front surface 56 that substantially conforms to, and covers, the opening 49 of the scale plate in adjacent parallel-plane or flush relation to the front surface of the plate. This construction is to avoid any unsightly interruption in the otherwise uniform plane surface of the scale plate and to facilitate mounting of the plate without threading the pointer through a narrow opening, with the likelihood of damage thereto. The construction facilitates assembly, and thereby economizes manufacture, to a considerable degree.

Conical notches 58 in the body portion 51 and the portion 55, respectively, provide end-thrust and laterally supporting bearings for a shaft 59 of the movable element 3.

The movable element 3 further comprises an ellipsoidal vane 61, on the shaft 59, having its major axis extending horizontally in the air gap of the permanent magnet 5 in the inoperative condition of the instrument to bias a pointer 62 to its zero or mid position, as shown in the drawings.

The pointer 62, mounted on the shaft 59 between the vane 61 and a retaining member 63, comprises an integral counterbalance portion 64 of substantially fan shape and a main indicating portion bent through the opening 48 for co-operation with the scale of the plate 4. The opening 48 is preferably formed of arcuate shape struck about the axis of the shaft 59 to permit the pointer 62 to properly move over its scale.

The operating magnet member 6 or yoke projects from the rear wall 11 of the casing 1 for the reception of a conductor of a circuit to be measured (not shown) and has pole ends 66 that, in assembling the instrument parts, initially extend loosely through relatively large openings in the wall 11. However, the pole ends 66 are each provided with a pair of projections 67, making a total of four of such projections, that are arranged in quadrature about the intermediate portion of the body member 51. These projections are preferably rectangular in cross-section and fit snugly into the corners formed in the member 51 by the intersection of the lug 54 and the portion 55 with the portion 51. After being so placed, the yoke 6 is permanently secured in position by pouring solder around the pole ends 66 in the above-mentioned relatively large openings in the rear wall 11.

Thus, by the use of the single punching or stamped member 7, the permanent magnet 5, the casing 1, the actuating magnet member 6 and the movable element 3 may be quickly placed in very accurate relation.

While I have shown and described a particular form of my invention, changes may be made therein without departing from the spirit and scope of the invention, and I desire, therefore, that only such limitations shall be placed thereon as are imposed by the prior art or are set forth in the appended claims.

I claim as my invention:

1. An electrical measuring instrument comprising a casing, a permanent magnet of substantially C-shape disposed in adjacent substantially parallel-plane relation to the rear wall of said casing, means disposed at an intermediate portion of each leg of the magnet for securing the same to said rear wall, a shaft, a vane carried by the shaft adjacent to the air gap of the magnet, and a member having a body portion of substantially U-shape bridged between, and held in position adjacent to its ends to said magnet-securing means and having an intermediate shaft-bearing portion of substantially U-shape in a plane substantially normal to the plane of the body portion.

2. An electrical measuring instrument comprising a casing, a permanent magnet of substantially C-shape therein, means co-operating with each leg of the magnet for positioning the latter relative to the casing, a shaft, a vane carried by the shaft adjacent to the air gap of the magnet, an actuating-magnet member for the vane disposed exterior to the casing and having quadrilaterally related polar projections extending through a wall of the casing, and a member bridged between and supported by said positioning means having a cruciform intermediate portion for positioning said polar projections and an extension of said intermediate portion constituting a bearing support for the shaft.

3. An electrical measuring instrument comprising a scale plate having portions shaped to provide an opening in which a pointer moves and an opening extending from said opening to the perimeter of the plate, a shaft having a portion disposed substantially normal to the plane of the plate behind said extending opening, a bearing for the shaft having a portion substantially fitting said extending opening flush with the front surface of the plate, and a pointer on the shaft having end portions on opposite sides of the plate and an intermediate portion extending through said first opening.

In testimony whereof, I have hereunto subscribed my name this 13th day of August, 1924.

VICTOR H. TODD.